March 24, 1936.  R. A. KLATT  2,034,984
SLED
Filed Feb. 13, 1935
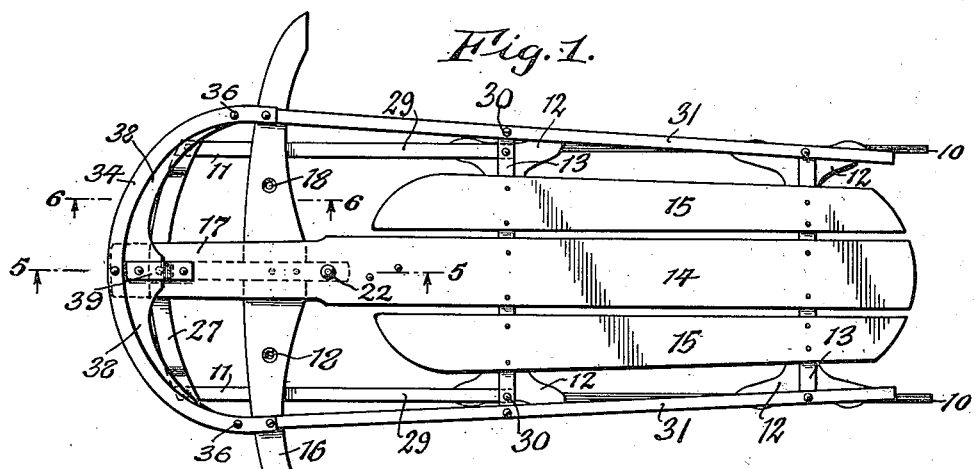
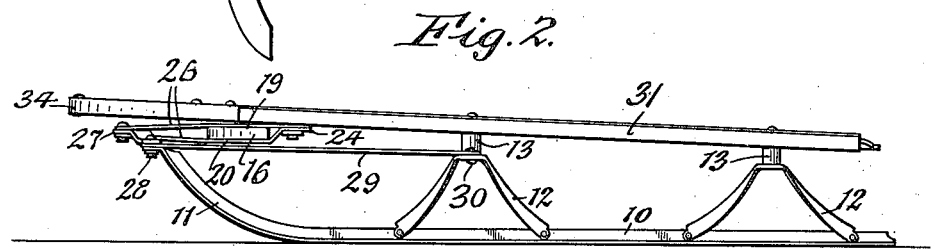
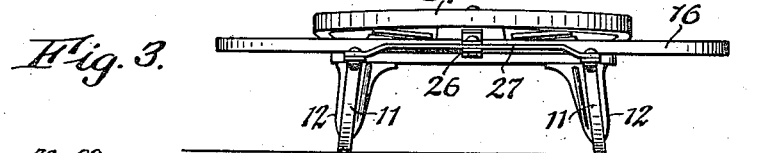
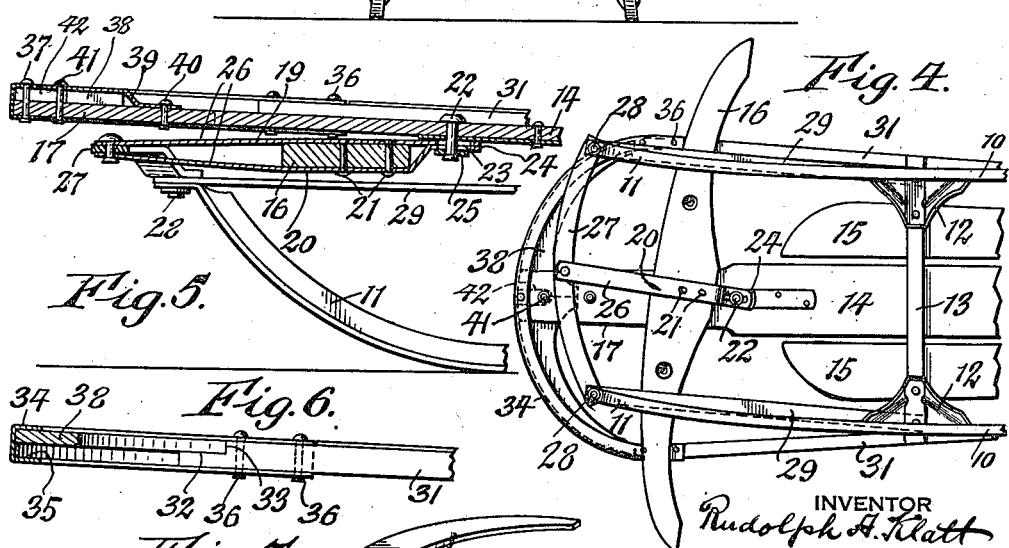
INVENTOR
Rudolph A. Klatt
BY Popp & Popp
ATTORNEYS Patented Mar. 24, 1936

2,034,984

UNITED STATES PATENT OFFICE 2,034,984

SLED

Rudolph A. Klatt, Tonawanda, N. Y., assignor to Auto-Wheel Coaster Company, Inc., North Tonawanda, N. Y., a corporation of New York Application February 13, 1935, Serial No. 6,299

8 Claims. (Cl. 280—22)

This invention relates to a juvenile sled of that type which contains means for steering the sled during its course, and more particularly to a sled of this character in which the front ends of the runners may be deflected laterally toward one side or the other and thus permit of steering the sled over the desired course.

One of the objects of this invention is to improve the steering mechanism of the sled so as to render the same stronger and more durable and permit of more easily and reliably steering the sled, and also carrying a greater load.

Another object of the invention is to provide an improved fender for the sled which will not only materially increase the strength of the same but also render it safer in use in the event of collision with obstructions or other sleds during coasting or like uses.

A further object of this invention is to so organize the sled that the same presents a streamline appearance and thus is not only more attractive but also capable of increased speed while coasting.

In the accompanying drawing:

Figure 1 is a top plan view of a juvenile sled embodying my improvements.

Figure 2 is a side elevation of the same.

Figure 3 is a front elevation thereof.

Figure 4 is a fragmentary bottom plan view of the front part of the sled showing the steering mechanism shifted for turning the sled to one side of a straight course.

Figures 5 and 6 are fragmentary vertical longitudinal sections, on an enlarged scale, taken on the correspondingly numbered lines in Fig. 1.

Figure 7 is a perspective view of one of the sections of the filler forming part of the front cross piece of the fender.

In the following description similar characters of reference indicate like parts in the several figures of the drawings:

The numerals 10, 10 represent the horizontal rear portions of the pair of runners of the sled which are preferably arranged parallel and are provided respectively with upwardly turned front ends 11 similar to sleds of this type now in common use.

These runners are constructed of flexible metal, such as spring steel, and the horizontal rear parts of the runners are held in a parallel position relatively to each other, while the front parts thereof are capable of lateral movement or deflection in either direction, so that the sled can either run straight ahead while the front and rear parts of these runners are in line, and the sled can also be steered toward the left or the right by deflecting the front parts of the runners accordingly.

Means are provided on the rear parts of the runners for supporting the deck of the sled thereon, which means in their preferred construction consist of knees or braces 12, 12 preferably made of metal and secured at their lower ends to the rear parts of the runners, and horizontal cross bars 13, each connected at its opposite ends with the upper ends of the corresponding knees.

The deck is mounted upon the central parts of the cross bars 13 and preferably comprises a longitudinal center board 14 which is of substantially the same length as the runners, and two side boards 15 arranged on opposite sides of the center board and extending to the rear end of the latter, but terminating a considerable distance short of the front end of the same, as best shown in Fig. 1. The cross bars 13 and the deck members are preferably constructed of wood, although any other suitable material may be used if desired.

The means for deflecting the front ends of the runners for steering purposes may be variously constructed as to detail, but in the preferred form these means are constructed as shown in the drawing, as follows:

The numeral 16 represents a horizontal transverse steering bar which has its central part arranged below the forwardly extending front part 17 of the center board of the deck, and has its opposite extremities projecting beyond the outer sides of the runners so that a party sitting on the sled can engage the ends of this steering bar with the feet and support the latter, and also enable this bar to be turned for steering purposes. This bar is also provided with a pair of holes 18 on opposite sides of its center in which may be secured the ends of a rope whereby the sled may be drawn by hand.

The numerals 19, 20 represent two longitudinal strips of metal which are secured with their central parts to each other and to the upper and lower sides of the central part of the steering bar by means of rivets 21, which strips extend rearwardly from the bar and form a supporting arm 24 which is pivotally and slidably mounted upon the underside of the adjacent part of the center board of the deck, this connection between said supporting arm and the respective deck member being preferably effected by means of a vertical pivot pin or rivet 22 having its upper part secured to the central deck board 14, while the lower part of this rivet passes through a longitudinal slot 23 formed in the rear parts of said arm 24. The lower end of the pivot pin 22 is provided with a washer 25 engaging with the underside of the supporting arm 24 and retaining the latter in the proper position against the under side of the deck member 14, as best shown in Fig. 5.

The metal strips 19 and 20 extend forwardly from the front side of the steering bar 16 so as to form a steering arm 26, which latter is secured at its front end to the central part of a transverse shifting bar 27. The opposite ends of the shifting bar are pivotally connected by means of vertical pivots 28 with the upturned front ends 11 of the two runners, whereby a turning motion in a horizontal plane imparted to the steering bar 16 and its arm 17 is transmitted to the front ends of the runners for causing the latter to be deflected either toward the right or, toward the left for steering the course of the sled accordingly.

During such movement the front ends of the runners are controlled by means of longitudinal retaining links 29, each of which is capable of swinging horizontally and is pivotally connected at its rear end with the outer end of one of the cross bars 13 by means of a pivot 30, while its front end is connected with the corresponding outer end of the shifting bar 27. The pivot 22 of the steering bar 16 is arranged forward of the pivotal connection 30 between the rear ends of the retaining links 29 and the foremost transverse supporting bar 13, so that these parts when actuated by the foot pressure on the steering bar 16, will turn about different centers, but cramping of the movement of the steering bar at this time is prevented by reason of the slot 23 in the supporting arm 24 which not only permits the steering bar to turn horizontally but also to slide fore and aft on the pivot pin 22 the requisite extent to avoid any cramping or binding action during the steering operation.

By arranging the steering bar 16 and associated parts on the underside of the front part of the deck it is possible to carry a load on the deck over a greater area and also permit this steering bar to be operated with such a load without interference with any of the movable parts, thereby materially enhancing the utility of this sled and the pleasure derived from its use.

For the purpose of effectively supporting the front end of the deck in order to increase the strength of the sled and also to effectively guard the same at the front end and opposite sides thereof against damage or injury during collision, a fender is provided which in the preferred form shown in the drawing is constructed as follows:

The numeral 31 represents two side rails or fender bars which are arranged lengthwise on opposite sides of the deck, and each of which is secured to the respective outer ends of the cross bars 13 by rivets or other suitable fastening. These side rails or fender bars terminate at their front ends about in line with the steering bar 16 and each of these side rails is provided at its front end with a rabbet which in the preferred construction forms a horizontal seat 32 facing upwardly and a shoulder 33 facing forwardly, as best shown in Fig. 6.

The numeral 34 represents the transverse front member or bar of the fender which preferably is of arch shape and has its central part curved forwardly and the opposite ends thereof projecting rearwardly. This arch shaped fender member is preferably constructed of sheet metal which is of U-shape form in cross section, and has its channel or concave inner side 35 facing rearwardly. The front end of each of the fender rails or bars is arranged within one rear end portion of the front fender section, which forms a socket therefor and is secured therein by means of rivets 36, as best shown in Fig. 6.

The front end of the center board extension 17 of the deck projects into the central part of the channel of the front fender section 34 and rests on the lower flange thereof, said parts being preferably secured to each other by a vertical rivet 37, as best shown in Fig. 5.

By thus extending the deck forwardly to the transverse member of the fender and connecting these parts in the manner shown, the deck is materially strengthened so as to enable the same to bear a heavier load, and a strong support is provided for the front part of the fender which enables the latter to more effectively resist shocks to which the same may be subjected when in collision, and thereby avoid injury to the sled and also increase the safety of the parties using the sled in various kinds of sports.

For the purpose of further increasing the strength or stiffness of the front or arch shaped member of the fender and enabling the same to withstand any blows to which the same may be subjected, a filler preferably constructed of wood is inserted into the hollow or channel side of this arch shaped fender member, which filler in the preferred construction comprises two segmental or curved pieces of wood 38, each of which is seated in approximately one-half of the channel shaped or hollow side of the front fender section on one side of the center thereof, and has its outer end resting on the horizontal face 32, and bearing rearwardly against the vertical shoulder 33 of the respective side rail 31, so as to form a stop therefor, as shown in Fig. 6, while the inner end of this filler section bears against the corresponding inner end of the other filler section, as shown by dotted lines in Fig. 4.

By this means any blow to which the front fender section may be subjected is taken up by the filler sections and transmitted to the side rails, whereby the effect of this blow is distributed over the stationary parts of the sled, and thereby reduces the liability of damaging the same.

In order to retain the inner ends of the filler sections 38 in their proper position within the channel shaped side of the front fender member, a longitudinal retaining strap 39 is provided, which latter is secured at its rear end by means of a rivet 40 to the front part of the center deck board, while the front part of this strap laps over the opposing inner ends of the filler sections 38 and is secured to the front part of the central deck section 14 in rear of the channel shaped arch member by means of a rivet 41.

In order to facilitate assemblage of the filler sections with the channel shaped fender member and also reduce the expense of boring holes in the filler sections to receive the rivet 41, the opposing inner ends of the filler sections are constructed to form a longitudinal slot 42 between the same. This slot receives the rivet 41 and opens forwardly to the front side of the filler sections so that each half of this slot in the respective end of each filler section has a notch or rivet, as shown in Fig. 7.

By thus making the filler in two sections it is possible to use small pieces of waste wood for this purpose, and thus effect economy in the cost of manufacturing.

In the preferred construction of this sled the deck and side rails of the fender slope from the front end of the sled downwardly toward the rear end thereof, and the side rails of the fender also converge rearwardly, thereby giving the sled as a whole a stream-line contour which not only gives the same a neat and attractive appearance but also reduces the wind resistance and enables the sled to acquire greater speed when using the same for coasting.

As a whole this sled has its various working parts well protected against possible injury and all its parts are strong and durable and not liable to get out of order when subjected to the severe usage which is usually encountered when employing the same for coasting or other sports.

I claim as my invention:

1. A sled comprising a pair of runners, a deck mounted on said runners and having a longitudinal center board of substantially the same length as said runners and side boards arranged on opposite sides of the center board and having their front ends terminating short of the front end of said center board, and a fender having side bars arranged lengthwise on opposite sides of the deck and mounted on the runners, and a forward arched cross piece having rearwardly extending opposite ends connected with the front ends of said side bars, and having its forwardly deflected central part connected with the front end of said center board, said cross piece being channel shaped in cross section and having its hollow side facing rearwardly.

2. A sled comprising a pair of runners, a deck mounted on said runners and having a longitudinal center board of substantially the same length as said runners and side boards arranged on opposite sides of the center board and having their front ends terminating short of the front end of said center board, and a fender having side bars arranged lengthwise on opposite sides of the deck and mounted on the runners, and a forward arched cross piece having rearwardly extending opposite ends connected with the front ends of said side bars, and having its forwardly deflected central part connected with the front end of said center board, said cross piece being channel shaped in cross section and having its hollow side facing rearwardly, and the hollow side of said cross piece containing a stiffening filler.

3. A sled comprising a pair of runners, a deck mounted on said runners and having a longitudinal center board of substantially the same length as said runners and side boards arranged on opposite sides of the center board and having their front ends terminating short of the front end of said center board, and a fender including two side bars arranged lengthwise on opposite sides of the deck, a forwardly curved arch bar of U-shaped cross section having its channel side opening rearwardly, its opposite ends connected with the front ends of said side bars and its central part connected with the front end of the center board of said deck, and a filler consisting of two segment shaped sections arranged end to end within the channel of said arch bar and on opposite sides of the center thereof.

4. A sled comprising a pair of runners, a deck mounted on said runners and having a longitudinal center board of substantially the same length as said runners and side boards arranged on opposite sides of the center board and having their front ends terminating short of the front end of said center board, and a fender including two side bars arranged lengthwise on opposite sides of the deck, a forwardly curved arch bar of U-shaped cross section having its channel side opening rearwardly, its opposite ends connected with the front ends of said side bars and its central part connected with the front end of the center board of said deck, and a filler consisting of two segment shaped sections arranged end to end within the channel of said arch bar and on opposite sides of the center thereof, and the opposing inner ends of said filler sections being provided with rabbets which together form a longitudinal slot between said filler sections, which slot receives the fastening connecting said arch bar and central deck board.

5. A sled comprising a pair of runners, a deck mounted on said runners and having a longitudinal center board of substantially the same length as said runners and side boards arranged on opposite sides of the center board and having their front ends terminating short of the front end of said center board, and a fender including two side bars mounted lengthwise on the runners on opposite sides of the deck and having a rabbet at its front end, a forwardly curved arch bar which is U-shaped in cross section and has secured in its opposite ends the front ends of said side bars while the central part of its channel receives the front end of said center board, a filler arranged within the channel of said arch bar and composed of sections which have their outer ends engaging with the rabbets of said side bars, while their opposing inner ends engage with each other and overlap the front part of said center board and are in part separated by an intervening slot, and fastening means extending through said slot and connecting said center board and arch bar.

6. A sled comprising a pair of runners, a deck mounted on said runners and having a longitudinal center board of substantially the same length as said runners and side boards arranged on opposite sides of the center board and having their front ends terminating short of the front end of said center board, and a fender including two side bars mounted lengthwise on the runners on opposite sides of the deck and each having a rabbet at its front end, a forwardly curved arch bar which is U-shaped in cross section and has secured in its opposite ends the front ends of said side bars while the central part of its channel receives the front end of said center board, a filler arranged within the channel of said arch bar and composed of sections which have their outer ends engaging with the rabbets of said side bars, while their opposing inner ends engage with each other and overlap the front part of said center board and are in part separated by an intervening slot, fastening means extending through said slot and connecting said center board and arch bar, and a longitudinal strap extending over parts of said center board and said filler sections and secured at its rear end to said center board in rear of said filler sections, and also secured at its front end to said center board in front of said filler sections by a fastening passing through said slot.

7. A sled comprising a pair of runners having their front ends free to move laterally, a deck mounted on the rear parts of said runners, a fender having side bars mounted lengthwise on the runners on opposite sides of the deck and a front cross piece having its opposite ends connected with the front ends of said side bars, while its central part is rigidly connected with the front end of the deck, a transverse steering bar arranged on the underside of said deck and pivoted thereto to swing horizontally and provided centrally with a forwardly projecting steering arm, and a cross bar connecting the front end of said steering arm with the front ends of said runners.

8. A sled comprising a pair of runners having their front ends free to move laterally, a deck mounted on the rear parts of said runners, a fender having side bars mounted lengthwise on the runners on opposite sides of the deck and a front cross piece having its opposite ends connected with the front ends of said side bars, while its central part is connected with the front end of the deck, a transverse steering bar pivoted on the underside of said deck to swing horizontally and provided centrally with a forwardly projecting steering arm, a cross bar connecting the front end of said steering arm with the front ends of said runners, and horizontally swinging links connecting the front ends of said runners with the deck and runners in rear of said steering bar.

RUDOLPH A. KLATT.